United States Patent
Stein et al.

(10) Patent No.: US 12,256,011 B2
(45) Date of Patent: *Mar. 18, 2025

(54) METHODS, SYSTEMS, AND MEDIA FOR SECURE AUTHENTICATION OF USERS BASED ON A BIOMETRIC IDENTIFIER AND KNOWLEDGE-BASED SECONDARY INFORMATION

(71) Applicant: Google LLC, Mountain View, CA (US)

(72) Inventors: David Stein, New York, NY (US); Ryan Vilim, Brooklyn, NY (US); John Wittrock, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,262

(22) Filed: Jun. 5, 2023

(65) Prior Publication Data

US 2023/0318838 A1    Oct. 5, 2023

Related U.S. Application Data

(63) Continuation of application No. 16/930,836, filed on Jul. 16, 2020, now Pat. No. 11,711,215.

(Continued)

(51) Int. Cl.
*H04L 9/32* (2006.01)
*G06F 21/32* (2013.01)
(Continued)

(52) U.S. Cl.
CPC ............ *H04L 9/3231* (2013.01); *G06F 21/32* (2013.01); *G06T 7/74* (2017.01); *G06T 17/20* (2013.01);
(Continued)

(58) Field of Classification Search
CPC ... H04L 9/3231; H04L 9/0643; H04L 9/0869; H04L 9/3236; H04L 63/0861;
(Continued)

(56) References Cited

U.S. PATENT DOCUMENTS

| | | |
|---|---|---|
| 2013/0279806 A1 | 10/2013 | Tonisson et al. |
| 2015/0301724 A1* | 10/2015 | Thibadeau, Sr. ... G06F 3/04847 715/765 |
| 2018/0285622 A1 | 10/2018 | Alsaadi |

OTHER PUBLICATIONS

Wang, Jun; Semi-Supervised Hashing for Scalable Image Retrieval (Year: 2010).

* cited by examiner

*Primary Examiner* — Bryan F Wright
(74) *Attorney, Agent, or Firm* — Lerner David LLP

(57) ABSTRACT

Methods, systems, and media for secure authentication of users using one or more biometric recognition systems are provided. In some embodiments, the method comprises: receiving an indication that a biometric identifier is to be used to authenticate a user to a service; receiving (i) the biometric identifier of the user from a capture device and (ii) knowledge-based secondary information associated with the user from an input device; determining a Voronoi cell identifier that corresponds to the biometric identifier; calculating a hash of the Voronoi cell identifier and the knowledge-based secondary information; transmitting the hash to a server device for verification; in response to transmitting the hash to the server device, receiving a response indicating whether the hash matches a previously stored hash that was stored in the server device; and determining whether to automatically authenticate the user to the service based on the response from the server device.

17 Claims, 5 Drawing Sheets

Related U.S. Application Data

(60) Provisional application No. 62/875,146, filed on Jul. 17, 2019.

(51) Int. Cl.
| | |
|---|---|
| *G06T 7/73* | (2017.01) |
| *G06T 17/20* | (2006.01) |
| *G06V 10/764* | (2022.01) |
| *G06V 40/12* | (2022.01) |
| *G06V 40/16* | (2022.01) |
| *H04L 9/06* | (2006.01) |
| *H04L 9/08* | (2006.01) |
| *H04L 9/40* | (2022.01) |

(52) U.S. Cl.
CPC ............ *G06V 10/764* (2022.01); *G06V 40/12* (2022.01); *G06V 40/172* (2022.01); *H04L 9/0643* (2013.01); *H04L 9/0869* (2013.01); *H04L 9/3236* (2013.01); *H04L 63/0861* (2013.01); *G06T 2207/30201* (2013.01)

(58) Field of Classification Search
CPC . G06F 21/32; G06T 7/74; G06T 17/20; G06T 2207/30201; G06V 10/764; G06V 40/12; G06V 40/172; H04W 12/06
USPC .......................................................... 713/186
See application file for complete search history.

METHODS, SYSTEMS, AND MEDIA FOR SECURE AUTHENTICATION OF USERS BASED ON A BIOMETRIC IDENTIFIER AND KNOWLEDGE-BASED SECONDARY INFORMATION

CROSS-REFERENCE TO RELATED APPLICATIONS

This application is a continuation, of U.S. application Ser. No. 16/930,836, filed on Jul. 16, 2020, the disclosure of which is incorporated herein by reference.

TECHNICAL FIELD

The disclosed subject matter relates to methods, systems, and media for secure authentication of users using one or more biometric recognition systems.

BACKGROUND

Biometric recognition systems are frequently used for authenticating a user, for example, to unlock a phone, to unlock a door, to make a payment, etc. In a more particular example, a mobile device may include a facial recognition system that provides biometric authentication for unlocking the mobile device, making a payment using a payment application, and providing other functions by generating a three-dimensional facial map. However, using these recognition techniques, such as facial recognition, for biometric authentication can cause a number of security problems. For example, because a user only has one face, the user's face must be used for authentication to each service or device that uses facial recognition for authentication (e.g., the user's face is used both to unlock their phone and authenticate the user to their banking service). There is a concern that a third-party application developer may have access to features or rough versions of the generated three-dimensional facial map of the user's face. In some cases, an image of the user's face can then be used in a non-consented way, for example, by a service that has stored an image of the user's face being hacked or otherwise breached.

These security issues can also occur in other biometric recognition systems, such as recognition systems that rely on fingerprint recognition, hand geometry recognition, retina recognition, iris recognition, earlobe geometry recognition, voice or speaker recognition, etc. For example, in a fingerprint recognition system, a corresponding recognition service may be performed that includes storing a fingerprint image and/or extracted features from the fingerprint image of one or more fingerprints of a user. The fingerprint image and/or extracted features from the fingerprint image can be obtained by an unauthorized user and used, for example, to impersonate the user.

Accordingly, it is desirable to provide new methods, systems, and media for secure authentication of users using one or more biometric recognition systems.

SUMMARY

Methods, systems, and media for secure authentication of users using one or more biometric recognition systems are provided.

In accordance with some embodiments of the disclosed subject matter, a method for authenticating users in a biometric recognition system is provided, the method comprising: receiving an indication that a biometric identifier is to be used to authenticate a user to a service; receiving (i) the biometric identifier of the user from a capture device and (ii) knowledge-based secondary information associated with the user from an input device; determining a Voronoi cell identifier that corresponds to the biometric identifier; calculating a hash of the Voronoi cell identifier and the knowledge-based secondary information; transmitting the hash to a server device for verification; in response to transmitting the hash to the server device, receiving a response indicating whether the hash matches a previously stored hash that was stored in the server device; and determining whether to automatically authenticate the user to the service based on the response from the server device.

In some embodiments, the biometric identifier is a facial image that is received using an image capturing device.

In some embodiments, the method further comprises: generating a set of random points based on a random seed; calculating a group of Voronoi cells based on the set of random points; and determining a mapping of a feature vector of the facial image to the group of Voronoi cells.

In some embodiments, the random seed is based on an identifier of the service.

In some embodiments, the group of Voronoi cells is calculated by identifying, for each random point in the set of random points, a region in which points in the region are close to the random point based on a distance metric.

In some embodiments, the hash is calculated based on the mapping of the feature vector to the group of Voronoi cells.

In some embodiments, a plurality of Voronoi cell identifiers are determined to correspond to the biometric identifier and wherein the hash is calculated for each of the plurality of Voronoi cell identifiers with the knowledge-based secondary information associated with the user.

In accordance with some embodiments of the disclosed subject matter, a system for authenticating users in biometric recognition systems is provided, the system comprising a memory and a hardware processor that, when executing computer executable instructions stored in the memory, is configured to: receive an indication that a biometric identifier is to be used to authenticate a user to a service; receive (i) the biometric identifier of the user from a capture device and (ii) knowledge-based secondary information associated with the user from an input device; determine a Voronoi cell identifier that corresponds to the biometric identifier; calculate a hash of the Voronoi cell identifier and the knowledge-based secondary information; transmit the hash to a server device for verification; in response to transmitting the hash to the server device, receive a response indicating whether the hash matches a previously stored hash that was stored in the server device; and determine whether to automatically authenticate the user to the service based on the response from the server device.

In accordance with some embodiments of the disclosed subject matter, a non-transitory computer-readable medium containing computer executable instructions that, when executed by a processor, cause the processor to perform a method for authenticating users in biometric recognition systems is provided, the method comprising: receiving an indication that a biometric identifier is to be used to authenticate a user to a service; receiving (i) the biometric identifier of the user from a capture device and (ii) knowledge-based secondary information associated with the user from an input device; determining a Voronoi cell identifier that corresponds to the biometric identifier; calculating a hash of the Voronoi cell identifier and the knowledge-based secondary information; transmitting the hash to a server device for verification; in response to transmitting the hash to the server device, receiving a response indicating whether the hash matches a previously stored hash that was stored in the server device; and determining whether to automatically authenticate the user to the service based on the response from the server device.

In accordance with some embodiments of the disclosed subject matter, a system for authenticating users in biometric recognition systems is provided, the system comprising: means for receiving an indication that a biometric identifier is to be used to authenticate a user to a service; means for receiving (i) the biometric identifier of the user from a capture device and (ii) knowledge-based secondary information associated with the user from an input device; means for determining a Voronoi cell identifier that corresponds to the biometric identifier; means for calculating a hash of the Voronoi cell identifier and the knowledge-based secondary information; means for transmitting the hash to a server device for verification; means for receiving a response indicating whether the hash matches a previously stored hash that was stored in the server device in response to transmitting the hash to the server device; and means for determining whether to automatically authenticate the user to the service based on the response from the server device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
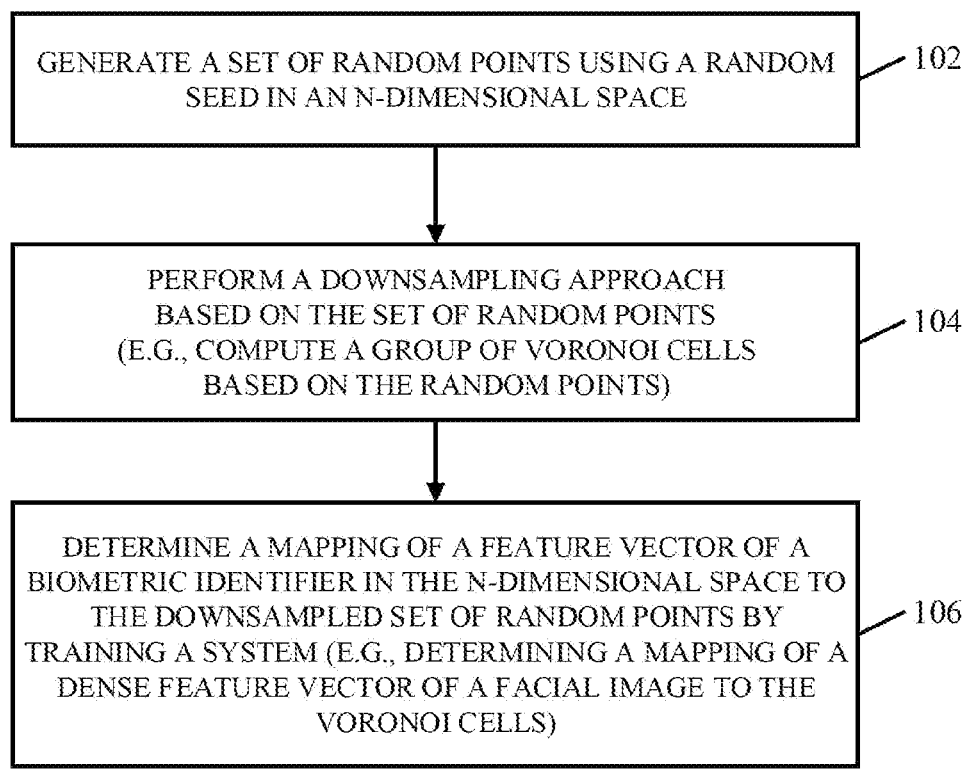
FIG. 1 shows an illustrative example of a process for initializing a system for secure authentication of users using one or more biometric recognition systems in accordance with some embodiments of the disclosed subject matter.

In accordance with various embodiments, mechanisms (which can include methods, systems, and media) for secure authentication of users using one or more biometric recognition systems are provided.

Generally speaking, the mechanisms described herein can be applied to any suitable biometric recognition system that receives a biometric identifier, such as a fingerprint recognition system that receives a fingerprint of a user, a hand geometry recognition system that receives a handprint or palm veins of a user, a retina recognition system that receives a retinal image of one or both eyes of a user, an iris recognition system that receives an image of one or both irises of a user, an earlobe geometry recognition system that receives an image of an ear of a user, and/or a voice or speaker recognition system that receives an audio file containing speech of a user. That is, the mechanisms described herein can be applied to any suitable spatial projection where proximity is relevant.

In some embodiments, the mechanisms described herein can allow a user to be authenticated to an application, a service, and/or a device using facial recognition. For example, in some embodiments, the mechanisms can authenticate a user to a particular user account associated with an application or service (e.g., a social networking service, a bank account, and/or any other suitable type of application or service) and/or a device (e.g., to unlock a mobile device, to activate a smart lock, and/or any other suitable device).

In some embodiments, the mechanisms can receive a biometric identifier corresponding to a user to be authenticated to the application, service, and/or device, as well as any suitable secondary information or knowledge-based information (e.g., a Personal Identification Number, or PIN, a password, and/or any other suitable secondary information), and can authenticate the user based on a combination of the biometric identifier and the secondary information. Examples of the biometric identifier can include an image of a physiological characteristic or physiological information associated with the shape of the body of a user, such as a fingerprint image, a palm print image, an image of palm veins, a face image, an image of hand geometry, an image of an iris, an image of a retina, etc. Examples of the biometric identifier can also include behavioral characteristics associated with a user, such as a media file that contains speech of a user, a media file that contains keystroke dynamics of a user, a media file that contains a gait, posture, or body movements of a user, etc.

In a more particular example, in an implementation in which biometric authentication includes a facial recognition system, the mechanisms can receive an image corresponding to a face of a user to be authenticated to the application, service, and/or device, as well as any suitable secondary information (e.g., a Personal Identification Number, or PIN, a password, and/or any other suitable secondary information), and can authenticate the user based on a combination of the image and the secondary information.

In some embodiments, the mechanisms described herein can authenticate the user using a combination of a biometric identifier and secondary information using any suitable technique or combination of techniques. For example, in an implementation in which biometric authentication includes a face recognition system, the mechanisms can compute a feature vector corresponding to the facial image and can then compute any suitable representation of the feature vector. As a more particular example, as described below in more detail in connection with FIGS. 1-3, the mechanisms can assign the feature vector to a Voronoi cell identifier from a group of Voronoi cell identifiers. As another more particular example, in some embodiments, any other suitable method of technique for down-sampling a feature vector associated with a biometric identifier can be used, such as grid tessellation, a machine learning classification system, a dimensionality reduction technique (e.g., t-Distributed Stochastic Neighbor Embedding (tSNE) with bucketing), tuned heuristics, and/or any other suitable technique or combination of techniques. In some embodiments, the mechanisms can then compute a hash of the representation of the feature vector and the secondary information. In some embodiments, to authenticate the user to a service, application, or device, the mechanisms can determine whether the computed hash matches a previously stored hash (e.g., a hash that was previously stored in connection with registration of the user to a facial recognition system).

In some embodiments, a representation of a feature vector of a biometric identifier (e.g., a facial image) can be determined in any suitable manner. For example, in some embodiments, as described below in more detail in connection with FIG. 1, a representation of a feature vector, such as assigning the feature vector to a Voronoi cell, can be based on an identifier of a particular application, service and/or device the user is to be authenticated to. As a more particular example, in some embodiments, a group of Voronoi cells can be generated using random points based on a random seed that corresponds to the identifier of the particular application, service, and/or device. In some embodiments, by basing a representation of a feature vector of a biometric identifier (e.g., a facial image) on an identifier of an application, service, and/or device the user is to be authenticated to, the mechanisms described herein can generate a different hash for different applications, services, and/or devices.

In some embodiments, the mechanisms described herein can be used to improve computer security. For example, by authenticating a user using a hash of a biometric identifier (such as a facial image) and secondary information (such as PIN or a password), the mechanisms described herein can prevent re-use of a biometric identifier (such as the facial image) of a particular user for malicious purposes. As a more particular example, in some embodiments, the mechanisms described herein can allow the biometric identifier of a user to be used to authenticate the user to different services, and, even if a particular service is breached, the biometric identifier of the user can still be securely used to authenticate the user to other services, because authentication is based on a hash of the biometric identifier with other information, rather than based on the biometric identifier alone.

Note that, although the mechanisms described herein generally describe authentication of a user using a biometric identifier, such as a facial image, this is merely illustrative. In some embodiments, the mechanisms described herein can be used for authenticating a user using any other suitable type of biometric data, such as a fingerprint, a handprint, an audio recording for speaker recognition, and/or any other suitable type of biometric data.

Additionally, note that, although the techniques described herein generally describe a user registering one or more biometric identifiers (such as a facial image) using a user device associated with the user (e.g., as shown in and described below in connection with FIG. 2) and a user being authenticated to a service or application using a user device associated with the user (e.g., as shown in and described below in connection with FIG. 3), in some embodiments, a user device associated with the user is not required. For example, in some embodiments, the techniques described herein can be used to authenticate a user to make a payment in a store without using a user device associated with the user (sometimes referred to herein as a "capturing device"). As a more particular example, in some embodiments, a camera or other suitable capturing device associated with the store (e.g., a camera associated with a device used for payment in the store, a security camera, and/or any other suitable capturing device) can be used to capture a facial image or a fingerprint of a user making a payment, and can be used to authenticate the user. As another example, in some embodiments, the techniques described herein can be used to authenticate a user to a building or an area of a building using a camera associated with the building (e.g., a camera associated with a device used to activate or deactivate a smart lock associated with the building, a security camera, and/or any other suitable capturing device).

Turning to FIG. 1, an illustrative example 100 of a process for initializing a system for authenticating users using one or more biometric recognition systems is shown in accordance with some embodiments of the disclosed subject matter. In some embodiments, process 100 can be executed on a server, such as server 402, as shown in and described below in connection with FIG. 4.

Process 100 can begin at 102 by generating a set of random points using a random seed. In some embodiments, the random seed can be any suitable seed or value. For example, in some embodiments, the random seed can be a value associated with an identifier of a particular application or service for which biometric recognition is to be used for authenticating users. As a more particular example, the random seed can be associated with a particular application or service (e.g., a banking service, an online payment service, an email service, a social networking service, and/or any other suitable service), an application executing on a mobile device to unlock the mobile device, an application for locking or unlocking a smart lock, and/or any other suitable type of application or service. In some embodiments, any suitable number (e.g., one hundred, one thousand, and/or any other suitable number) of random points can be generated based on the random seed. In some embodiments, the random points can be within any suitable N-dimensional space.

At 104, process 100 can compute a group of Voronoi cells based on the set of random points. In some embodiments, the Voronoi cells can be computed using any suitable technique or combination of techniques. For example, in some embodiments, the group of Voronoi cells can be computed by identifying, for each random point in the set of random points, a region for which points in the region are closer to the random point than any other random point. In some embodiments, any suitable distance metric can be used to compute a Voronoi cell (e.g., Euclidean distance, Manhattan distance, and/or any other suitable distance metric). In some embodiments, a unique identifier can be assigned to each Voronoi cell.

As mentioned above, process 100 can perform any suitable method or technique that down-samples a feature vector rather than assigning a feature vector to a Voronoi cell. For example, in some embodiments, process 100 can use grid tessellation, any suitable machine learning classification system, t-Distributed Stochastic Neighbor Embedding (tSNE) with bucketing, tuned heuristics, and/or any other suitable technique or combination of techniques. In some embodiments, any suitable training set of biometric identifiers (such as facial images) can be used to generate parameters to be used to map a feature vector to an identifier. In some embodiments, any parameters used to map a feature vector to an identifier can then be transmitted to and/or shared in any suitable manner with devices used to register a biometric identifier (such as a facial image) of a user and/or authenticate a user using a biometric identifier, as shown in and described below in connection with FIGS. 2 and 3.

In some embodiments, process 100 can perform a machine learning classification system approach for particular types of biometric identifiers (e.g., audio samples for voice or speaker recognition) and a Voronoi cell approach for other types of biometric identifiers (e.g., face images for facial recognition). In a more particular example, process 100 can use a lip reading model (such as LipNet), which is a model that maps a variable-length sequence of video frames to text, to perform speech recognition.

At 106, process 100 can determine a mapping of a feature vector of biometric identifiers to the group of Voronoi cells using any suitable training. In some embodiments, process 100 can determine a feature vector for biometric identifiers using any suitable technique or combination of techniques, such as by training a neural network, and/or using any other suitable techniques. For example, in instances where a neural network is trained to determine a feature vector, the neural network can be trained to capture any suitable information, such as that pictures of the same face are the same regardless of lighting or changes in angle/perspective, and/or any other suitable information. That is, in some embodiments, different pictures of the same face can result in the same feature vector or feature vectors that are highly similar (e.g., in a similar portion of an N-dimensional space represented by the feature vectors). In some embodiments, a feature vector can include any suitable number of values or components. Note that, in some embodiments, the feature vector can be determined based on any suitable amount of training data, for example, by training any suitable type of neural network or other machine learning algorithm.

In some embodiments, process 100 can map values or components of the feature vector to the Voronoi cells in any suitable manner. For example, in some embodiments, process 100 can down-sample values or components of the feature vector into a hash that corresponds to a particular Voronoi cell of the group of Voronoi cells. Note that, in some embodiments, the same feature vector can always map to the same Voronoi cell. Note that, in instances where there are more potential feature vectors (e.g., feature vectors that can be calculated from different biometric identifiers), process 100 can map feature vectors to Voronoi cells such that each Voronoi cell is mapped to roughly the same number of feature vectors (that is, in an even distribution).

Note that, in some embodiments, process 100 can use any other suitable method or technique of down-sampling a feature vector rather than assigning a feature vector to a Voronoi cell. For example, in some embodiments, process 100 can use grid tessellation, any suitable machine learning classification system, t-Distributed Stochastic Neighbor Embedding (tSNE) with bucketing, tuned heuristics, and/or any other suitable technique or combination of techniques. In some embodiments, any suitable training set of facial images can be used to generate parameters to be used to map a feature vector to an identifier. In some embodiments, any parameters used to map a feature vector to an identifier can then be transmitted to and/or shared in any suitable manner with devices used to register a facial image of a user and/or authenticate a user using a facial image, as shown in and described below in connection with FIGS. 2 and 3.

In some embodiments, the mapping of the feature vector of biometric identifiers to the group of Voronoi cells can then be used by a user device to generate a hash, as described below in connection with FIGS. 2 and 3. For example, in some embodiments, a server executing process 100 can transmit the mapping to user devices that use the system described herein for authenticating users using one or more biometric recognition systems.

Figure 2:
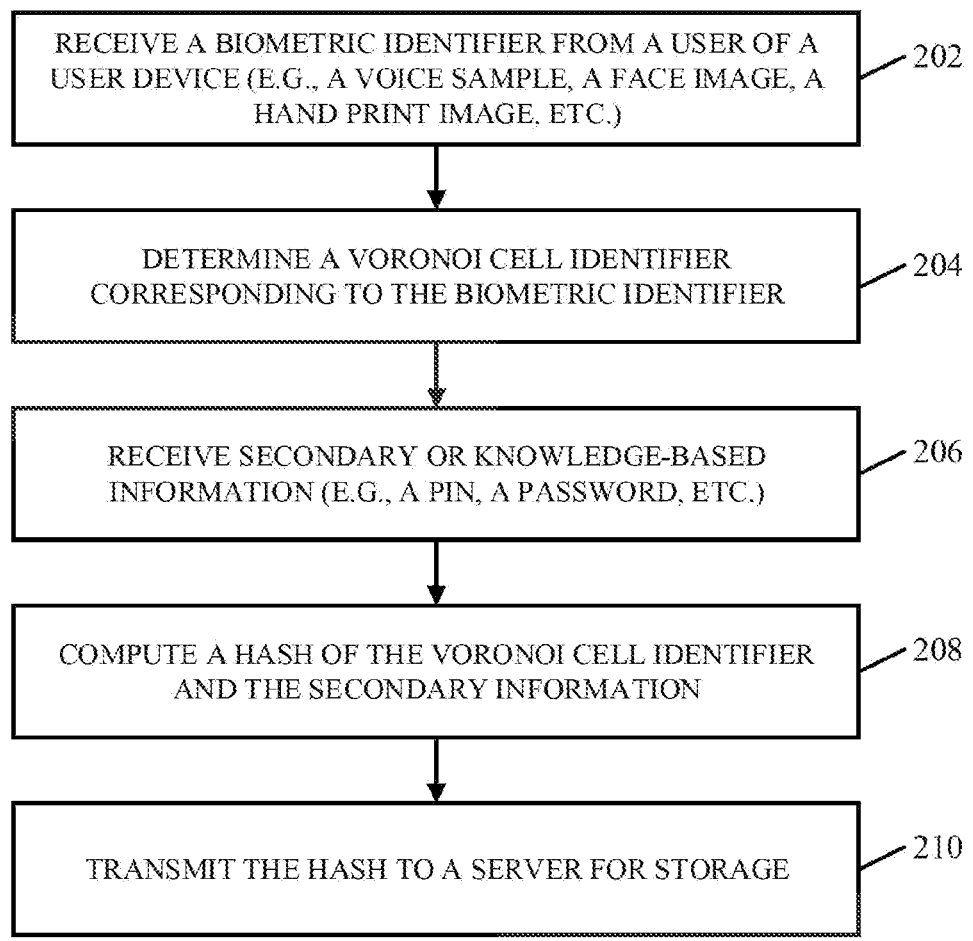
FIG. 2 shows an illustrative example of a process for registering users of a system for secure authentication of users using one or more biometric recognition systems in accordance with some embodiments of the disclosed subject matter.
Figure 3:
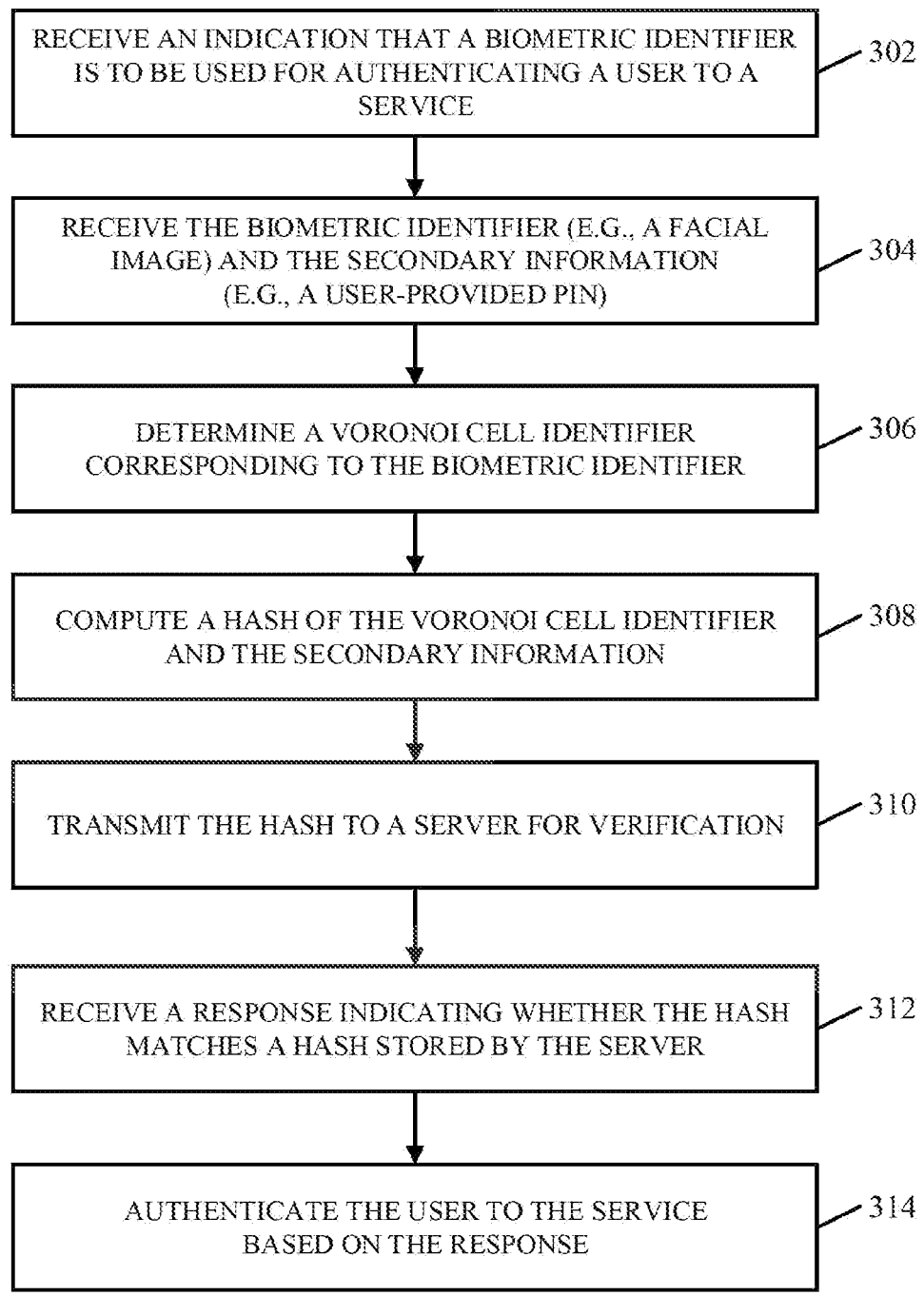
FIG. 3 shows an illustrative example of a process for secure authentication of a user using one or more biometric recognition systems in accordance with some embodiments of the disclosed subject matter.

Note that, although FIGS. 2 and 3 describe a user of a user device registering a biometric identifier, such as a facial image, corresponding to the user for use in authentication with an application or service (FIG. 2) and providing a biometric identifier, such as a facial image, for authentication to an application or service using the user device (FIG. 3), in some embodiments, a user device of the user is not required. For example, in some embodiments, a user can be authenticated for payment in a store using a previously registered facial image where the facial image of the user can be captured by a camera associated with the store, and/or any other suitable camera not belonging to the user. As another example, in some embodiments, a user can be authenticated to enter a building (e.g., an apartment building, an office building, and/or any other suitable building) and/or a portion of a building or other area where the facial image of the user can be captured by a camera associated with the building, and/or any other suitable camera not belonging to the user. In some such embodiments, a device associated with the camera can perform any of the blocks described below in connection with FIGS. 2 and 3 for processing a captured facial image, collecting secondary information, computing a hash associated with the captured facial image and secondary information, transmitting the hash to a server, and/or any other suitable techniques.

Turning to FIG. 2, an illustrative example 200 for registering a biometric identifier (such as a facial image) associated with a user for authentication of the user using the biometric identifier is shown in accordance with some embodiments of the disclosed subject matter. In some embodiments, process 200 can be executed on a user device associated with the user.

Process 200 can begin at 202 by receiving a biometric identifier from a user of the user device. Examples of the received biometric identifier can include an image of a physiological characteristic or physiological information associated with the shape of the body of a user, such as a fingerprint image, a palm print image, an image of palm veins, a face image, an image of hand geometry, an image of an iris, an image of a retina, etc. Examples of the received biometric identifier can also include behavioral characteristics associated with a user, such as a media file that contains speech of a user, a media file that contains keystroke dynamics of a user, a media file that contains a gait, posture, or body movements of a user, etc.

In some embodiments, process 200 can receive the biometric identifier using any suitable techniques. For example, in implementations including a facial recognition system, process 200 can receive a facial image from a camera associated with the user device (e.g., a front-facing camera of a mobile device, a rear-facing camera of a mobile device, and/or any other suitable type of camera). In some embodiments, process 200 can receive the facial image in connection with an application executing on the user device, such as an application to which the user is to be authenticated using facial recognition. In some such embodiments, the application can prompt the user to take a picture of a face of the user using a camera associated with the user device, for example, by automatically opening an application associated with the camera, by presenting instructions on the user device, and/or in any other suitable manner.

At 204, process 200 can determine a Voronoi cell identifier that corresponds to the received biometric identifier. In some embodiments, process 200 can determine the Voronoi cell identifier based on any suitable information and using any suitable technique. For example, in some embodiments, the user device executing process 200 can have previously received a mapping of a feature vector of biometric identifiers to Voronoi cell identifiers from a server, as described above in connection with block 106 of FIG. 1. In some such embodiments, process 200 can determine a feature vector of the biometric identifier (e.g., a facial image) using any suitable technique or combination of techniques, and can identify a corresponding Voronoi cell identifier assigned to the feature vector and/or values of the feature vector based on the received mapping. Note that, in some embodiments, process 200 can determine multiple Voronoi cell identifiers (e.g., two, three, and/or any other suitable number), for example, in an instance where characteristics of the biometric identifier are close to a border of multiple Voronoi cells. In some embodiments, process 200 can be limited in a number of identified Voronoi cell identifiers (e.g., no more than two, no more than three, and/or any other suitable number).

At 206, process 200 can receive secondary information. For example, in some embodiments, the secondary information can be secondary authentication information for an application for which the user is registering facial recognition information. In some embodiments, the secondary information can include any suitable secondary information, such as a PIN, a password, and/or any other suitable secondary information. In some embodiments, the secondary information can be received in any suitable manner, such as via a keyboard of the user device, via a touchscreen of the user device, and/or in any other suitable manner.

At 208, process 200 can compute a hash of the Voronoi cell identifier and the secondary information. In some embodiments, process 200 can compute the hash using any suitable technique, such as by using any suitable cryptographic hash function. In some embodiments, the computed hash can be of any suitable length. Note that, in some embodiments, in instances where multiple Voronoi cell identifiers were identified at block 204, process 200 can compute a hash for each Voronoi cell identifier.

At 210, process 200 can transmit the hash (or multiple hashes) to a server for storage. For example, in some embodiments, the server can be associated with a particular service or application for which the hash is to authenticate the user of the user device. In some embodiments, the server can store the hash in connection with any suitable identifier of the user and/or the user device for future authentication of the user to the service or application, as described below in connection with FIG. 3.

Turning to FIG. 3, an illustrative example 300 of a process for authenticating a user of a user device to an application or service using one or more recognition systems is shown in accordance with some embodiments of the disclosed subject matter. In some embodiments, blocks of process 300 can be executed by a user device.

Process 300 can begin at 302 by receiving an indication that a particular biometric identifier (e.g., a facial image) is to be used for authenticating a user to a service. In some embodiments, the indication can be received in any suitable manner and based on any suitable information. For example, in some embodiments, the indication can be received in response to determining that a particular application or website has been opened on the user device and that a user of the user device has not yet been authenticated to the application or website.

At 304, process 300 can, in response to receiving the indication that a particular biometric identifier is to be used for authenticating a user to a service, receive the biometric identifier (e.g., a facial image, an audio clip of the user's voice, etc.) and any suitable secondary information (e.g., a password, a PIN, etc.). As described above in connection with block 202 of FIG. 2, in some embodiments, the biometric identifier can be received in any suitable manner. For example, in implementations in which a facial recognition system receives facial images for authentication, a camera associated with the user device can capture the facial image. In some embodiments, process 300 can cause an application associated with a camera of the user device to be automatically opened to capture the facial image. In some embodiments, the secondary information can include any suitable information. For example, in some embodiments, as described above in connection with block 206 of FIG. 2, the secondary information can include a PIN, a password, and/or any other suitable secondary information. Note that, in some embodiments, the facial image and the secondary information can be received in any suitable order.

At 306, process 300 can determine a Voronoi cell identifier corresponding to the biometric identifier received at block 304. In some embodiments, process 300 can determine the Voronoi cell identifier in any suitable manner. For example, in some embodiments, process 300 can compute a feature vector associated with the biometric identifier using any suitable technique or combination of techniques. Note that, in some embodiments, any suitable parameters and/or algorithms used to compute the feature vector can have been previously received from a server, such as a server associated with an application or service the user is to be authenticated to. In some embodiments, process 300 can then identify the Voronoi cell identifier based on the computed feature vector. For example, in some embodiments, process 300 can use a previously received mapping of feature vector components or values to Voronoi cell identifiers (e.g., received from a server, as described above in connection with block 106 of FIG. 1).

At 308, process 300 can compute a hash of the Voronoi cell identifier and the secondary information. In some embodiments, process 300 can compute the hash using any suitable technique or combination of techniques. For example, in some embodiments, process 300 can compute the hash using any suitable cryptographic hash protocol. Note that, in some embodiments, process 300 can use the same protocol to compute the hash at block 308 as the protocol used at block 208 of FIG. 2 when registering the biometric identifier.

At 310, process 300 can transmit the computed hash to a server for verification. For example, in some embodiments, the server can be a server associated with the service or the application the user of the user device is to be authenticated to. As described above in connection with block 210 of FIG. 2, in some embodiments, the server can have previously stored a hash associated with the facial image when registering the biometric identifier as corresponding to the user of the user device. In some such embodiments, the server can verify that the hash received from the user device at block 310 matches the hash stored by the server during registration, as received at block 210 of FIG. 2. Note that, in some embodiments, process 300 can transmit the hash to the server in any suitable manner, such as via communication network 404, as shown in and described below in connection with FIG. 4.

At 312, process 300 can receive a response from the server indicating whether the hash transmitted at block 310 matches a previously stored hash corresponding to the user of the user device. For example, in some embodiments, the received response can indicate that the hash transmitted at block 310 matches a previously stored hash corresponding to the user of the user device, and that the user device is therefore to be authenticated to the service or application. As another example, in some embodiments, the received response can indicate that the hash transmitted at block 310 does not match a previously stored hash corresponding to the user of the user device, and that the user device is therefore not to be authenticated to the service or application.

Note that, in some embodiments, the server can directly authenticate the user device to the service or application. For example, in some embodiments, in response to determining that the hash transmitted at 310 matches a previously stored hash, the server can log-in to a user account associated with the user of the user device and/or associated with the biometric identifier. In some such embodiments, the server can transmit a response to the user device indicating that the service or application has been authenticated, for example, that the user account has been logged-in to.

At 314, process 300 can authenticate the user to the service in response to receiving a response from the server indicating that the hash transmitted at 310 matches the previously stored hash. In some embodiments, process 300 can authenticate the user to the service in any suitable manner. For example, in instances where the service corresponds to locking or unlocking a smart lock, process 300 can cause the lock to be activated in any suitable manner. As another example, in instances where the service corresponds to logging in to a particular user account, process 300 can cause any suitable user interface to be presented on the user device indicating that the user account has been logged-in to.

Note that, in some embodiments, in instances where the server directly authenticates the user device to the service or the application, block 314 can be omitted.

Figure 4:
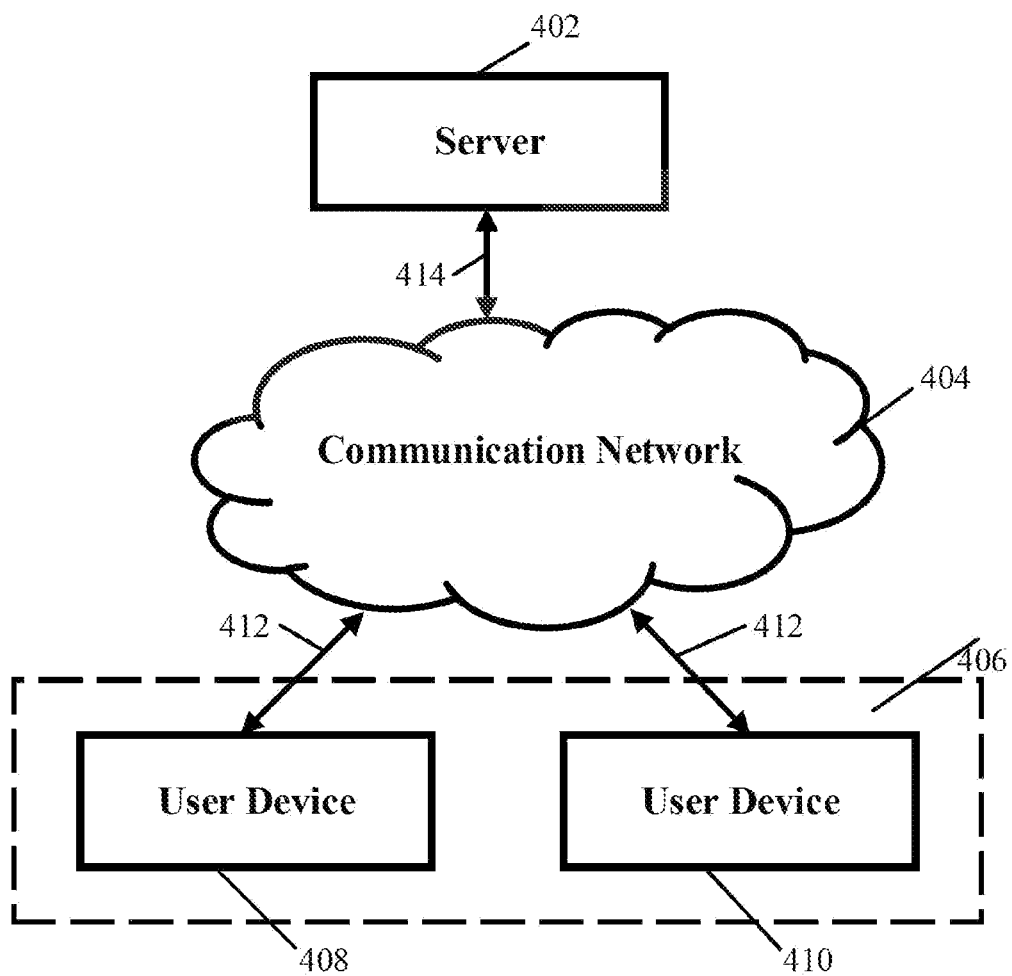
FIG. 4 shows a schematic diagram of an illustrative system suitable for implementation of mechanisms described herein for secure authentication of users using one or more biometric recognition systems in accordance with some embodiments of the disclosed subject matter.

Turning to FIG. 4, an illustrative example 400 of hardware for authenticating users using one or more recognition systems that can be used in accordance with some embodiments of the disclosed subject matter is shown. As illustrated, hardware 400 can include a server 402, a communication network 404, and/or one or more user devices 406, such as user devices 408 and 410.

Server 402 can be any suitable server(s) for storing information, data, programs, and/or any other suitable type of content. Additionally, in some embodiments, server 402 can be used to authenticate users using one or more recognition systems. For example, in some embodiments, server 402 can store a hash associated with facial features or other biometric features of users and secondary information, and can authenticate a user by determining if a hash transmitted by the user via a user device of the user matches a stored hash, as described above in more detail in connection with FIGS. 1 and 3.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for authenticating a user using one or more recognition systems. For example, in some embodiments, user devices 406 can receive biometric identification data (e.g., facial image data), receive secondary information data (e.g., knowledge-based user information, such as a PIN), generate a hash based on the biometric identification data and the secondary information data, and/or perform any other suitable functions. In some embodiments, user devices 406 can include any suitable types of devices. For example, in some embodiments, user devices 406 can include a mobile phone, a tablet computer, a wearable computer, a desktop computer, a laptop computer, television, speakers, a media player, a vehicle entertainment system, and/or any other suitable type of user device.

Although server 402 is illustrated as one device, the functions performed by server 402 can be performed using any suitable number of devices in some embodiments. For example, in some embodiments, multiple devices can be used to implement the functions performed by server 402.

Although two user devices 408 and 410 are shown in FIG. 4 to avoid over-complicating the figure, any suitable number of user devices, and/or any suitable types of user devices, can be used in some embodiments.

Figure 5:
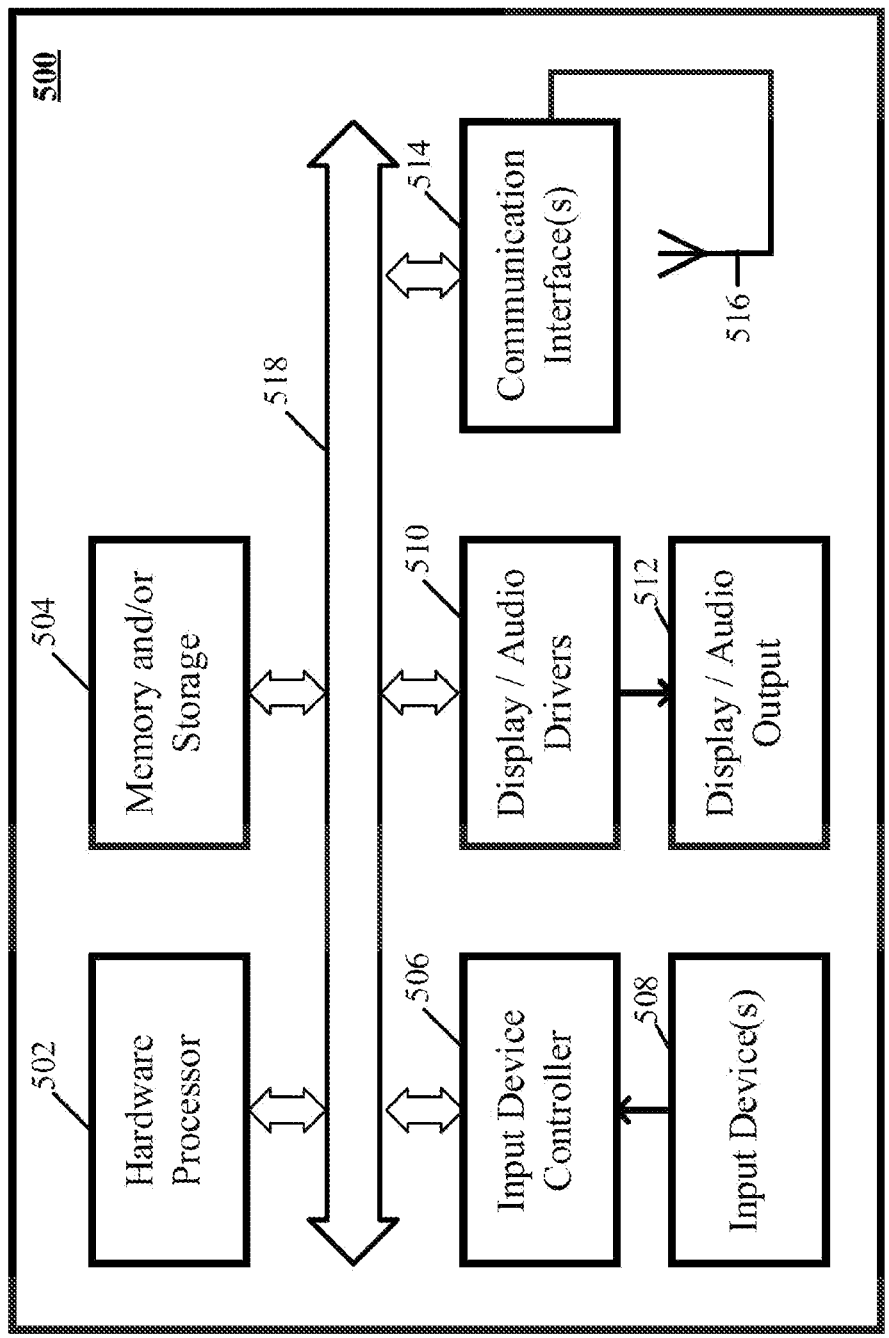
FIG. 5 shows a detailed example of hardware that can be used in a server and/or a user device of FIG. 4 in accordance with some embodiments of the disclosed subject matter.

Server 402 and user devices 406 can be implemented using any suitable hardware in some embodiments. For example, in some embodiments, devices 402 and 406 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 502 can be controlled by a server program stored in memory and/or storage of a server, such as server 502. For example, in some embodiments, the server program can cause hardware processor 502 to train a system to map a feature vector to a Voronoi cell (e.g., as described above in connection with FIG. 1), store a hash associated with a particular user of a user device, determine whether a received hash matches a stored hash, and/or perform any other suitable functions. In some embodiments, hardware processor 502 can be controlled by a computer program stored in memory and/or storage 504 of user device 406. For example, the computer program can cause hardware processor 502 to receive a biometric identifier (e.g., a facial image) and/or secondary information (e.g., a user-generated PIN or password), generate a hash based on the biometric identifier and the secondary information, transmit the generated hash to a server, and/or perform any other suitable functions.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory. It should be noted that, memory and/or storage 504 associated with server 402 can be configured to inhibit the storage of biometric identifiers (e.g., fingerprints, voice recordings, facial images, etc.) and, instead, can be configured to store hash information that was generated from a biometric identifier and secondary information using a user device.

Input device controller 506 can be any suitable circuitry for controlling and receiving input from one or more input devices 508 in some embodiments. For example, input device controller 506 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks (e.g., computer network 404). For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

In some embodiments, at least some of the above described blocks of the processes of FIGS. 1-3 can be executed or performed in any order or sequence not limited to the order and sequence shown in and described in connection with the figures. Also, some of the above blocks of FIGS. 1-3 can be executed or performed substantially simultaneously where appropriate or in parallel to reduce latency and processing times. Additionally or alternatively, some of the above described blocks of the processes of FIGS. 1-3 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for secure authentication of users using one or more biometric recognition systems are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

The invention claimed is:

1. A method for authenticating users in a biometric recognition system, the method comprising:
   receiving an indication that a biometric identifier is to be used to authenticate a user to a service;
   receiving (i) the biometric identifier of the user from a capture device and (ii) knowledge-based secondary information associated with the user from an input device;
   generating a set of random points based on a random seed, wherein the random seed is associated with the service;
   determining a feature vector that corresponds to the biometric identifier;
   generating a map of the feature vector to the set of random points;
   calculating a hash based on the map of the feature vector and the knowledge-based secondary information;
   transmitting the hash to a server device for verification;
   in response to transmitting the hash to the server device, receiving a response indicating whether the hash matches a previously stored hash that was stored in the server device; and
   determining whether to automatically authenticate the user to the service based on the response from the server device.

2. The method of claim 1, wherein the biometric identifier is a facial image that is received using an image capturing device.

3. The method of claim 2, further comprising:
   calculating a group of Voronoi cells based on the set of random points; and
   determining a mapping of the feature vector of the facial image to the group of Voronoi cells.

4. The method of claim 3, wherein the group of Voronoi cells is calculated by identifying, for each random point in the set of random points, a region in which points in the region are close to the random point based on a distance metric.

5. The method of claim 3, wherein the hash is calculated based on the mapping of the feature vector to the group of Voronoi cells.

6. The method of claim 1, wherein a plurality of feature vectors are determined to correspond to the biometric identifier and wherein the hash is calculated for each of the plurality of feature vectors with the knowledge-based secondary information associated with the user.

7. A system for authenticating users in a biometric recognition system, the system comprising:
   a memory; and
   a hardware processor that, when configured to execute computer executable instructions stored in the memory, is configured to:
      receive an indication that a biometric identifier is to be used to authenticate a user to a service;
      receive (i) the biometric identifier of the user from a capture device and (ii) knowledge-based secondary information associated with the user from an input device;
      generate a set of random points based on a random seed, wherein the random seed is based on the identifier of the device;
      determine a feature vector that corresponds to the biometric identifier;
      generate a map of the feature vector to the set of random points;
      calculate a hash based on the map of the feature vector and the knowledge-based secondary information;
      transmit the hash to a server device for verification;
      in response to transmitting the hash to the server device, receive a response indicating whether the hash matches a previously stored hash that was stored in the server device; and
      determine whether to automatically authenticate the user to the service based on the response from the server device.

8. The system of claim 7, wherein the biometric identifier is a facial image that is received using an image capturing device.

9. The system of claim 8, wherein the hardware processor is further configured to:
   generate a set of random points based on a random seed;
   calculate a group of Voronoi cells based on the set of random points; and
   determine a mapping of the feature vector of the facial image to the group of Voronoi cells.

10. The system of claim 9, wherein the group of Voronoi cells is calculated by identifying, for each random point in the set of random points, a region in which points in the region are close to the random point based on a distance metric.

11. The system of claim 9, wherein the hash is calculated based on the mapping of the feature vector to the group of Voronoi cells.

12. The system of claim 7, wherein a plurality of Voronoi cell identifiers are determined to correspond to the biometric identifier and wherein the hash is calculated for each of the plurality of Voronoi cell identifiers with the knowledge-based secondary information associated with the user.

13. A non-transitory computer-readable medium containing computer executable instructions that, when executed by a processor, cause the processor to perform a method for authenticating users in a biometric recognition system, the method comprising:
   receiving an indication that a biometric identifier is to be used to authenticate a user to a service;
   receiving (i) the biometric identifier of the user from a capture device and (ii) knowledge-based secondary information associated with the user from an input device;
   generate a set of random points based on a random seed, wherein the random seed is based on the identifier of the device;
   determining a feature vector that corresponds to the biometric identifier;
   generate a map of the feature vector to the set of random points;
   calculating a hash based on the map of the feature vector and the knowledge-based secondary information;
   transmitting the hash to a server device for verification;
   in response to transmitting the hash to the server device, receiving a response indicating whether the hash matches a previously stored hash that was stored in the server device; and
   determining whether to automatically authenticate the user to the service based on the response from the server device.

14. The non-transitory computer-readable medium of claim 13, wherein the biometric identifier is a facial image that is received using an image capturing device.

15. The non-transitory computer-readable medium of claim 14, wherein the method further comprises:
   calculating a group of Voronoi cells based on the set of random points; and
   determining a mapping of the feature vector of the facial image to the group of Voronoi cells.

16. The non-transitory computer-readable medium of claim 14, wherein the group of Voronoi cells is calculated by identifying, for each random point in the set of random points, a region in which points in the region are close to the random point based on a distance metric.

17. The non-transitory computer-readable medium of claim 14, wherein the hash is calculated based on the mapping of the feature vector to the group of Voronoi cells.

* * * * *